No. 633,479. Patented Sept. 19, 1899.
G. OGDEN.
COTTON DISTRIBUTER.
(Application filed Jan. 9, 1899.)
(No Model.) 4 Sheets—Sheet 1.
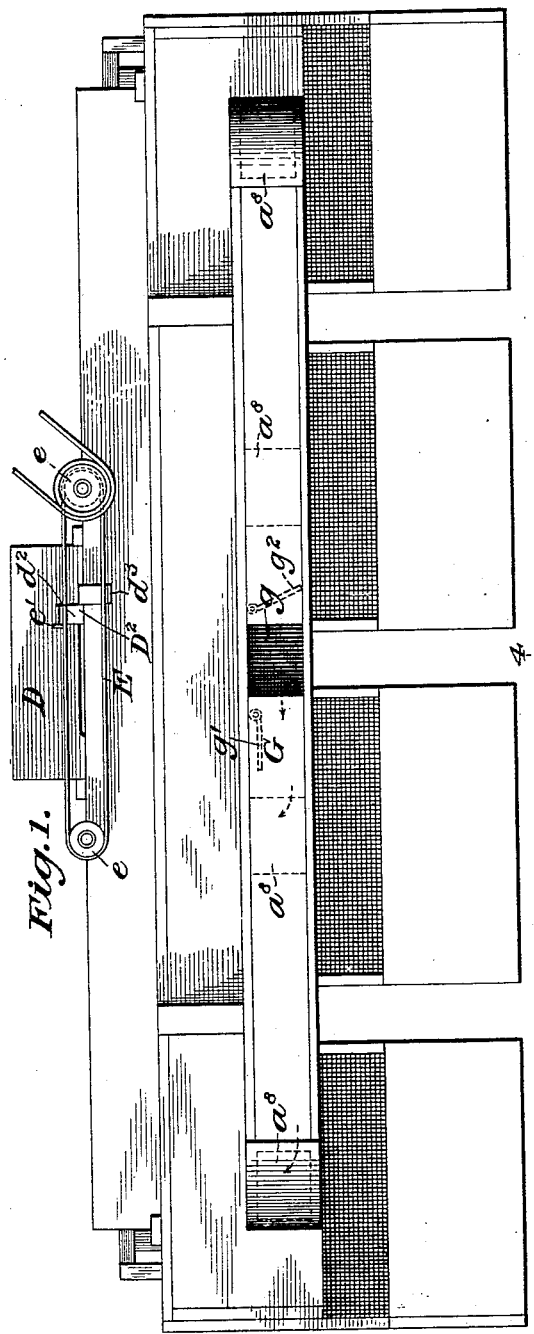
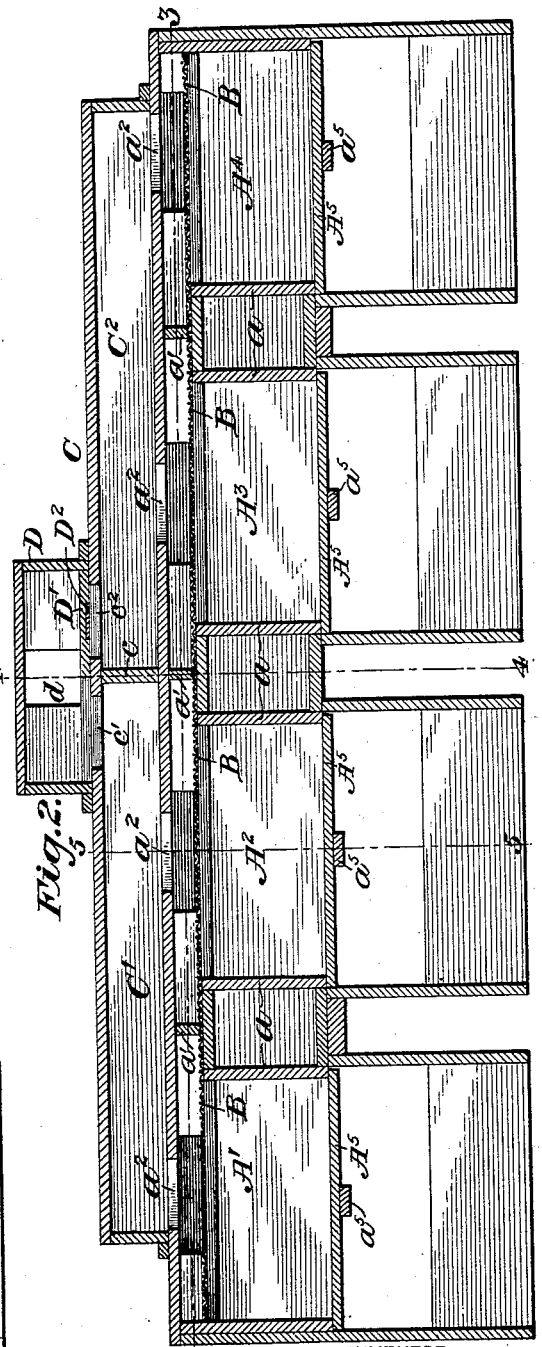
WITNESSES
C. W. Smith
Grace P. Brereton
INVENTOR
George Ogden
by J. C. D. Sturtevant,
his Attorney No. 633,479. Patented Sept. 19, 1899.
G. OGDEN.
COTTON DISTRIBUTER.
(Application filed Jan. 9, 1899.)
(No Model.) 4 Sheets—Sheet 2.
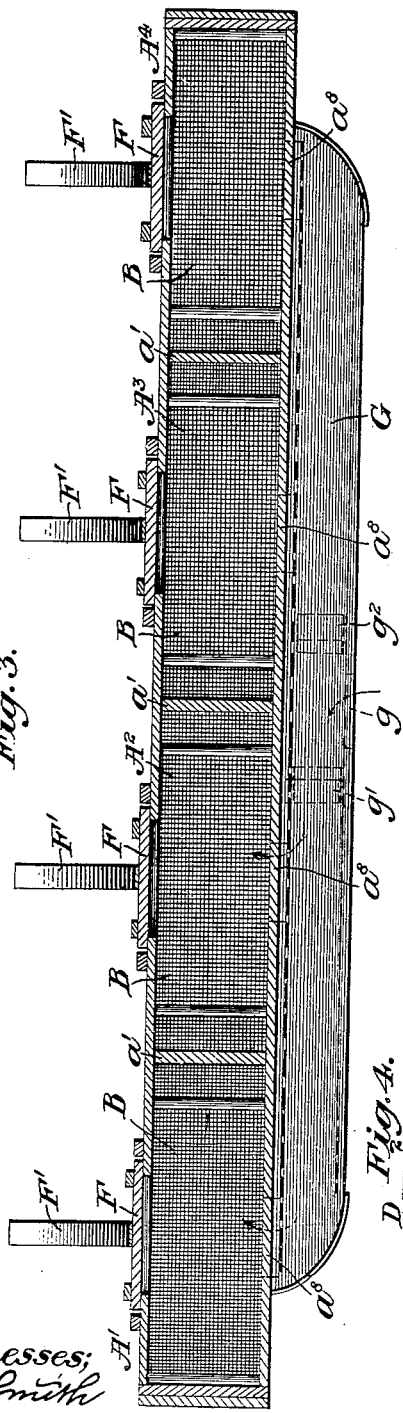
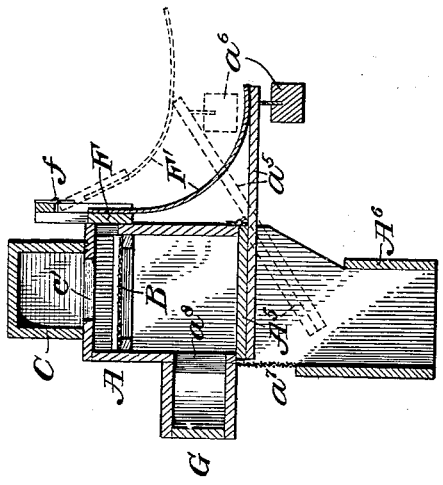
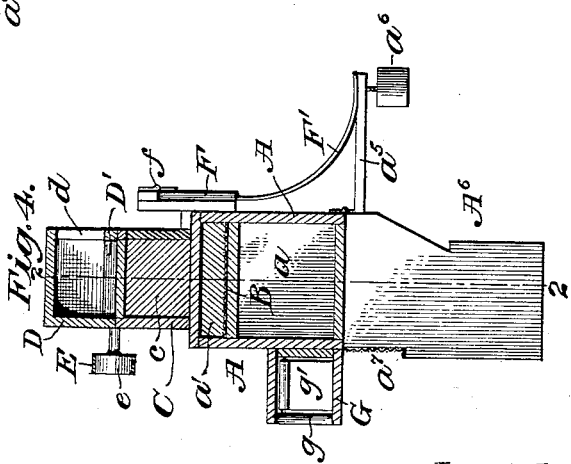
Witnesses:
O. W. Smith
Grace P. Brereton
Inventor:
George Ogden
By C. B. Sturtevant
his Atty.
THE NORRIS PETERS CO., PHOTO-LITHO., WASHINGTON, D. C.

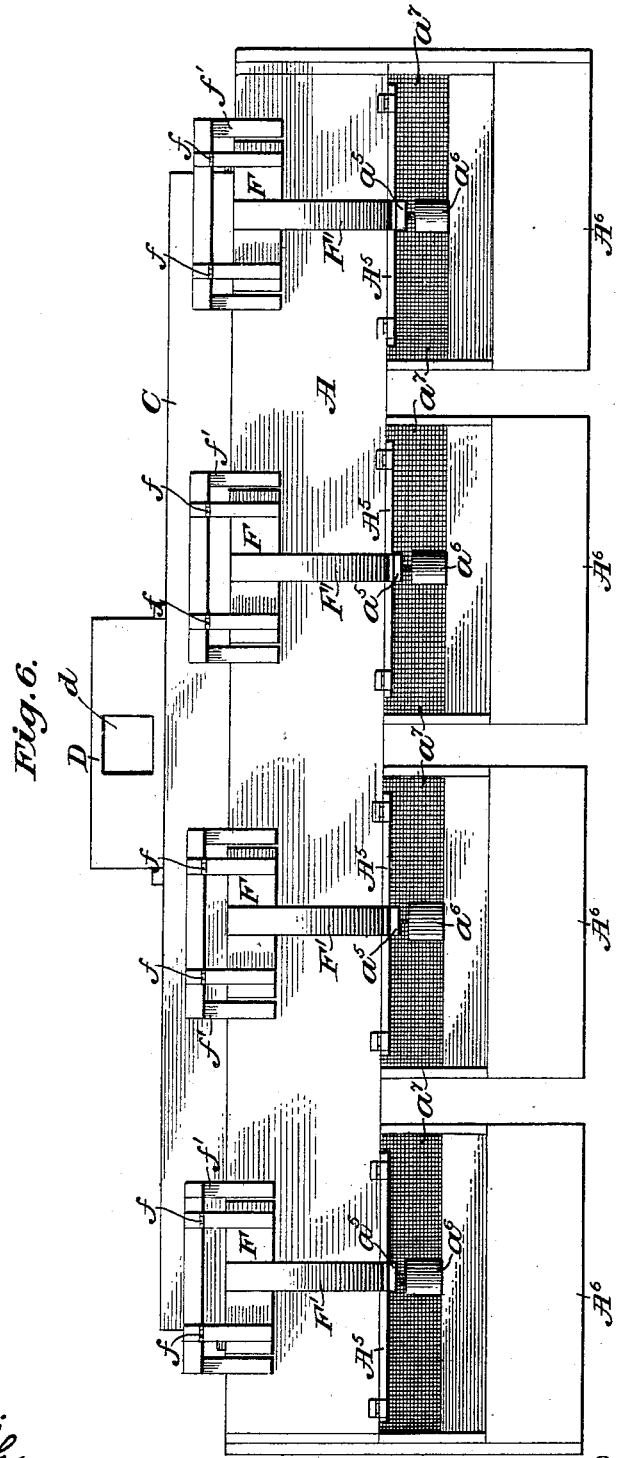

No. 633,479. Patented Sept. 19, 1899.
G. OGDEN.
COTTON DISTRIBUTER.
(Application filed Jan. 9, 1899.)
(No Model.) 4 Sheets—Sheet 4.
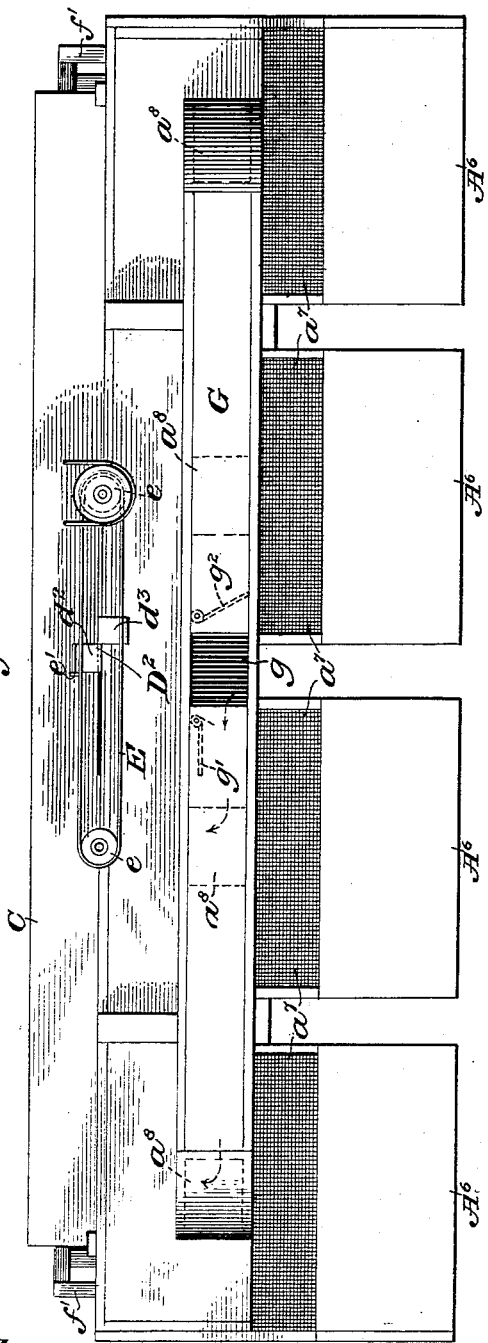
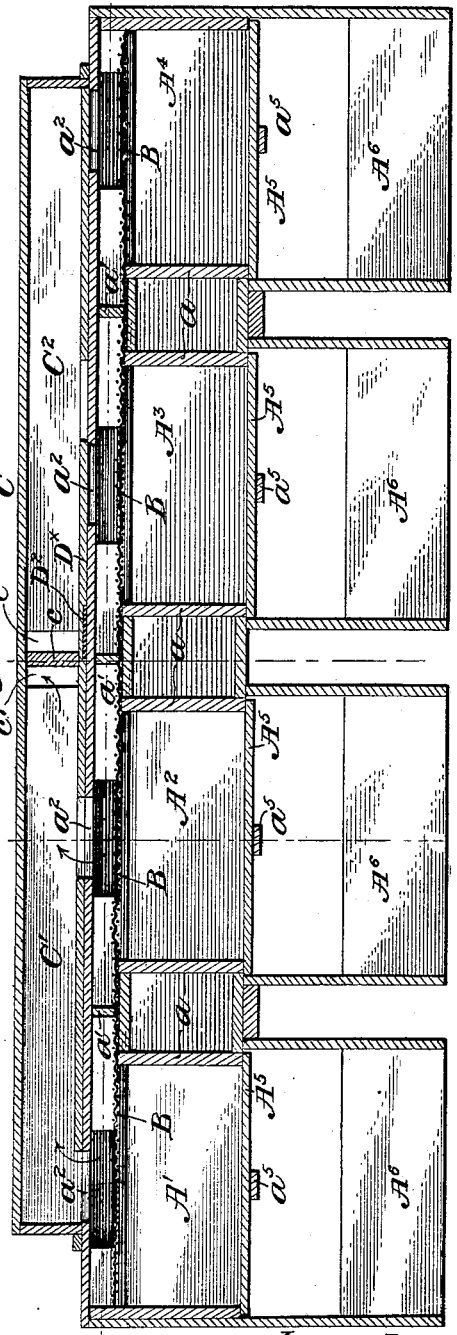
Witnesses:
C. W. Smith
Grace P. Brereton
Inventor:
George Ogden
By C. S. Sturtevant
his Atty.

UNITED STATES PATENT OFFICE.

GEORGE OGDEN, OF OGDEN, TEXAS.

COTTON-DISTRIBUTER.

SPECIFICATION forming part of Letters Patent No. 633,479, dated September 19, 1899.

Application filed January 9, 1899. Serial No. 701,623. (No model.)

*To all whom it may concern:*

Be it known that I, GEORGE OGDEN, a citizen of the United States, residing at Ogden, in the county of Falls, State of Texas, have invented certain new and useful Improvements in Cotton-Distributers, of which the following is a description, reference being had to the accompanying drawings, and to the letters of reference marked thereon.

The invention relates to that class of pneumatic conveyers used in conveying seed-cotton from a wagon or chamber and distributing and delivering it to a battery of gins or other point of delivery.

The principal object of my invention is to provide a series of valves, ducts, and screens which divide the conveyer into separate circuits, so that a continuous flow of cotton or other material operated upon to the desired amount takes place through one circuit of the conveyer to one gin or series of gins of a battery while the draft is automatically closed to the other conveyer-circuit.

A further object is to provide an air-inlet valve actuated automatically to form an open circuit from the fan or blower through that screened compartment which is discharging its contents to a gin or series of gins of a battery, thus relieving the screen or screens at that point from all suction, so that the cotton will not be prevented from dropping from the screen or screens and open bottom of said receptacle. Thus the open circuit to the blower through the conveyer may be utilized to blow or fan the cotton-seed from the gins.

These objects I attain by the mechanism shown in the accompanying drawings, in which—

Figure 1 is a front elevation of a pneumatic conveyer containing my improvements. Fig. 2 is a central vertical longitudinal section on line 2 2, Fig. 4. Fig. 3 is a horizontal section on line 3 3, Fig. 2. Fig. 4 is a transverse vertical section on line 4 4, Fig. 2. Fig. 5 is a similar view on line 5 5, Fig. 2. Fig. 6 is a rear elevation of the apparatus or that side opposite to the one shown in Fig. 1. Fig. 7 is a front elevation similar to Fig. 1, but showing a modification. Fig. 8 is a central vertical longitudinal section thereof.

A represents the screen-box, divided into four compartments $A'$ $A^2$ $A^3$ $A^4$ by means of transverse box-like partitions $a$, which do not extend quite to the top of the box A, and the comparting of the box is completed by the narrow partitions $a'$, resting on top of the box-like partitions $a$. The upper portion of each compartment is separated from its lower portion by means of the screens B, and over every screen the top of the box A is provided with a draft-opening $a^2$, which opens into the wind-trunk C, which trunk is divided into two compartments $C'$ $C^2$ by a middle partition $c$. Adjacent to this partition $c$ and at opposite sides thereof draft openings or ports $c'$ $c^2$ are formed in the top of the wind-trunk, and these openings or ports open into a valve-chamber D, provided with an opening $d$, to which the fan or blower (not shown) is connected.

$D'$ is a slide-valve operating over the ports $c'$ $c^2$, as shown in Figs. 2 and 3, to alternately open one and close the other. This valve D is provided with an external yoke $D^2$, having its arms $d^2$ $d^3$ lying one above the other.

E is an endless belt mounted on pulleys $e$ $e$ and provided with a flexible pin or projection $e'$, which alternately strikes and passes the arms $d^2$ $d^3$ to shift the valve $D'$, as will be readily understood. The pin $e'$ and belt E both yield, owing to their flexibility, when the valve reaches its extreme throw, so that the pin will pass the arm $d^2$, after which it will be carried by the belt into engagement with arm $d^3$ to move the valve $D'$ to the left, and so on indefinitely. A drive-pulley $e^2$ operates the belt E at any desired rate of speed.

To return now to the screen-box A, it will be seen that each one of its compartments is provided with a downwardly-swinging door $A^5$, which when closed forms the bottom of the compartment. These doors are provided with outwardly-extending arms $a^5$, having counterbalancing-weights $a^6$ on their outer ends to close the doors and assist the draft in holding the doors closed against the weight of the cotton accumulating thereon. These doors $A^5$ work within receptacles or chutes $A^6$, leading to the respective gins of a battery. The fronts of these receptacles or chutes $A^6$ are provided adjacent to the free or distal edges of the doors with screened openings $a^7$ to permit air to enter when the doors or valves $A^5$ swing down and relieve the cotton in chutes or receptacles $A^6$ from all suction or draft tending to draw it back into the screen-boxes B.

The rear wall of the screen-box A above its screens B is provided with openings or ports $a^9$, one for every compartment $A'$ $A^2$ $A^3$ $A^4$, and these openings or ports are closed by outwardly-swinging valves F, hinged at their upper edges, as shown at $f$, to brackets or supports $f'$, projecting from the screen-box A. The valves F are opened automatically whenever the doors $A^5$ swing down by means of the curved arms $F'$, which are in sliding contact at their lower ends with the upper sides of the arms $a^5$. (See particularly Fig. 5.)

The front wall of the screen-box B is provided with inlet-openings $a^8$, all of which open into the inlet conveyer-duct G, which has an inlet-opening $g$ in the middle of its front wall, (see Fig. 1,) which is to be connected in the usual manner with the cotton to be conveyed to the gins. This duct G is provided at opposite sides of its inlet $g$ with oppositely-inclined gravity-valves $g'$ $g^2$, which are hinged at their upper ends, so as to swing upwardly toward opposite ends of the duct.

From the foregoing it will be seen that with the valve $D'$ in the position shown in Figs. 1 and 2 the draft-circuit will be through the section $C'$ of the wind-trunk C, through sections $A'$ $A^2$ of the screen-box, and through the left-hand portion of the inlet-duct G, thus holding the valve $g'$ raised, as shown in dotted lines, Fig 1. The suction will therefore draw the cotton or other light material into the two chambers $A'$ $A^2$ until enough has accumulated, and at this time the pin $e'$ on belt E will act on the lower arm $d^3$ and cause it to move the valve $D'$ to the left and over the port $c'$, which will open the port $c^2$. There being no suction now in the chambers $A'$ $A^2$ their doors $A^5$ will drop and the material will be discharged into the receptacles or chutes $A^6$. In the event of so much material accumulating in receptacles $A^6$ as to prevent the cotton sliding off of the doors $A^5$ all suction tending to hold it up to the screens B will be prevented by reason of the opening of the valves F, so that should the belt reverse the slide-valve $D'$ before the cotton in the two left-hand receptacles has been removed the draft-circuit will be through the valves F and through the screened openings $a^7$ and will not draw the cotton back to the screens B. When the draft-circuit is directed by valve $D'$ through the right-hand compartments $A^3$ $A^4$, the valve $g^2$ will swing up and the valve $g'$ will close. After the cotton sinks in the receptacle $A^6$ so that that on the doors $A^5$ slides off the weights $a^6$ will close the doors and the valves F will also close and complete the circuit.

Referring now to Figs. 7 and 8, it will be seen that I merely omit the valve-chamber D and its valve $D'$ and place an apertured slide-valve $D^\times$ in the wind-trunk C, said valve being of a length to control all four ports $a^2$. This valve is actuated in the same manner and by the same mechanism as the valve $D'$ of the other figures, and the trunk C is provided with draft-openings $c^7$ at opposite sides of its partition for connection with the blower or fan.

The improved conveyer may be employed with any number of gins usually employed to form a battery, and where an odd number are employed—for instance, three—it is only necessary to adjust the sliding valve and its ports one-third, as against two-thirds the distance between the pulleys $e$.

I do not confine myself to any particular dimensions or shape of chambers, ducts, or pipes, nor to any particular point of location for the circuit-changing slide-valve.

It will be seen that one section of the conveyer may be examined, &c., without stopping the feed of the others to the gins and that the overfeeding to either group of gins will not operate to stop the conveyer by clogging the screens of the screen-box, owing to the formation of the open draft-circuit.

What I claim is—

1. A pneumatic conveyer comprising a divided wind-trunk, receiving-chambers screened from the said trunk, an inlet-duct common to all of the said chambers, a valve to change the suction or draft from one side of the trunk to the other and provided with operating-arms, and an endless driven belt having a pin or projection to successively engage and pass the said valve-arms to shift the valve in opposite directions.

2. The combination in a pneumatic conveyer having its wind-trunk centrally divided and provided with a valve-chamber opening into the wind-trunk at both sides of its partition and having an air-inlet for connection with a blower or fan, receiving-chambers screened from the wind-trunk and an inlet-duct common to all of said receiving-chambers, of a slide-valve in said valve-chamber to alternately open and close the openings to the wind-chest and thereby reverse the draft-circuit through the conveyer, upper and lower arms connected to the said valve, and a driven endless belt crossing said arms and provided with a pin or projection to successively engage said valve-arms and move the valve in opposite directions; substantially as described.

3. A pneumatic conveyer, comprising the screen-box, divided into compartments and each compartment having a horizontal screen near its top and a downwardly-swinging door at its bottom, suction-ports in the top of the compartments above the screens, and relief-ports in one side of the compartments above the screens, an inlet-duct in front of and common to all of the compartments below the screens, a wind-box over said suction-ports, outwardly-swinging hinged valves for said relief-ports, and connections between the said valves and the downwardly-swinging doors, substantially as described.

4. The combination with the screen-box, downwardly-swinging doors forming the bottoms thereof, and weighted arms extending outwardly from the doors, an inlet-duct for the box, and a wind-trunk, of valves for admitting air to the screen-box above its screens and downwardly and outwardly extending curved arms with their free lower ends slidingly engaging the upper sides of the weighted arms for operation thereby; substantially as described.

5. The combination with the screen-box and its downwardly-opening doors, receptacles or conductors below the doors and having screened relief-openings adjacent to the free edges of the doors, an inlet-duct for the screen-box and a wind-trunk, of automatically-operated air-inlet valves to admit air to the screen-box above its screens when the doors swing down; substantially as described.

6. The combination with the comparted screen-box, an inlet-duct therefor provided with inwardly-opening valves pivoted at their upper edges in said duct to swing upwardly in opening at opposite sides of its inlet-opening, and a centrally-divided wind-chest having ports, of a valve mechanism to alternately open and close said ports and change the draft through the conveyer from one series of screened compartments to the other; substantially as described.

In testimony whereof I affix my signature in presence of two witnesses.

GEORGE OGDEN.

Witnesses:
J. A. DUNKUM,
R. A. REED.